United States Patent [19]

Small et al.

[11] 3,915,642

[45] Oct. 28, 1975

[54] QUANTITATIVE ANALYSIS OF SINGLE ION SPECIES

[75] Inventors: Hamish Small; Timothy S. Stevens, both of Midland, Mich.

[73] Assignee: The Dow Chemical Company, Midland, Mich.

[22] Filed: Aug. 6, 1973

[21] Appl. No.: 386,265

[52] U.S. Cl........... 23/230 R; 23/253 R; 73/61.1 C; 210/25; 210/37; 210/38; 210/31 C
[51] Int. Cl.$^2$............... G01N 27/08; G01N 31/04; G01N 31/08
[58] Field of Search......... 23/230 R, 253 R; 210/24, 210/25, 31 C, 37, 38, 284, 294; 127/9; 73/61.1 C

[56] References Cited
UNITED STATES PATENTS

| | | | |
|---|---|---|---|
| 2,422,054 | 6/1947 | Tiger | 210/25 |
| 2,617,766 | 11/1952 | Emmett | 210/25 |
| 2,711,995 | 6/1955 | Sard | 210/25 |
| 2,938,868 | 5/1960 | Carlson | 210/25 |
| 3,382,034 | 5/1968 | Kraus | 210/24 X |
| 3,495,943 | 2/1970 | Kapff | 23/230 R |
| 3,551,107 | 12/1970 | Hrdina | 23/230 R |
| 3,676,106 | 7/1972 | Hazen | 210/24 X |
| 3,694,160 | 9/1972 | Sagusa | 23/230 R |
| 3,694,369 | 9/1972 | Orlandini | 210/38 X |

OTHER PUBLICATIONS
Sargent–Welch Scientific Catalog, p. 371, 1971.

*Primary Examiner*—Morris O. Wolk
*Assistant Examiner*—Sidney Marantz
*Attorney, Agent, or Firm*—Edward E. Schilling

[57] ABSTRACT

Method of quantitative analysis of a single ion species paired with at least one species of counter valent ion in an aqueous or highly polar sample solution, the solution containing substantially no other ions of the same valence as said single ion species, save for ions capable of forming a relatively undissociated ion pair with hydrogen ions or hydroxide ions, in which the sample solution is added to an ion exchange resin bed, the resin being an ion exchange resin capable of exchanging ions of the same valence as the at least one species of counter valent ion and the ion exchange resin being in an ion form easily eluted by other ions of the same valence, eluting the single ion species from the ion exchange resin bed and quantitatively detecting the single ion species with a conductivity cell and associated read-out means.

The apparatus is an ion exchange column charged with an ion exchange resin in an ion form easily elutable by the counter valent ions accompanying a single ion species to be determined, a conductivity cell and associated read-out means, means for bringing sample solution and eluant water to the ion exchange column and liquid conduit means for conducting effluent from the ion exchange column to the conductivity cell.

8 Claims, 1 Drawing Figure

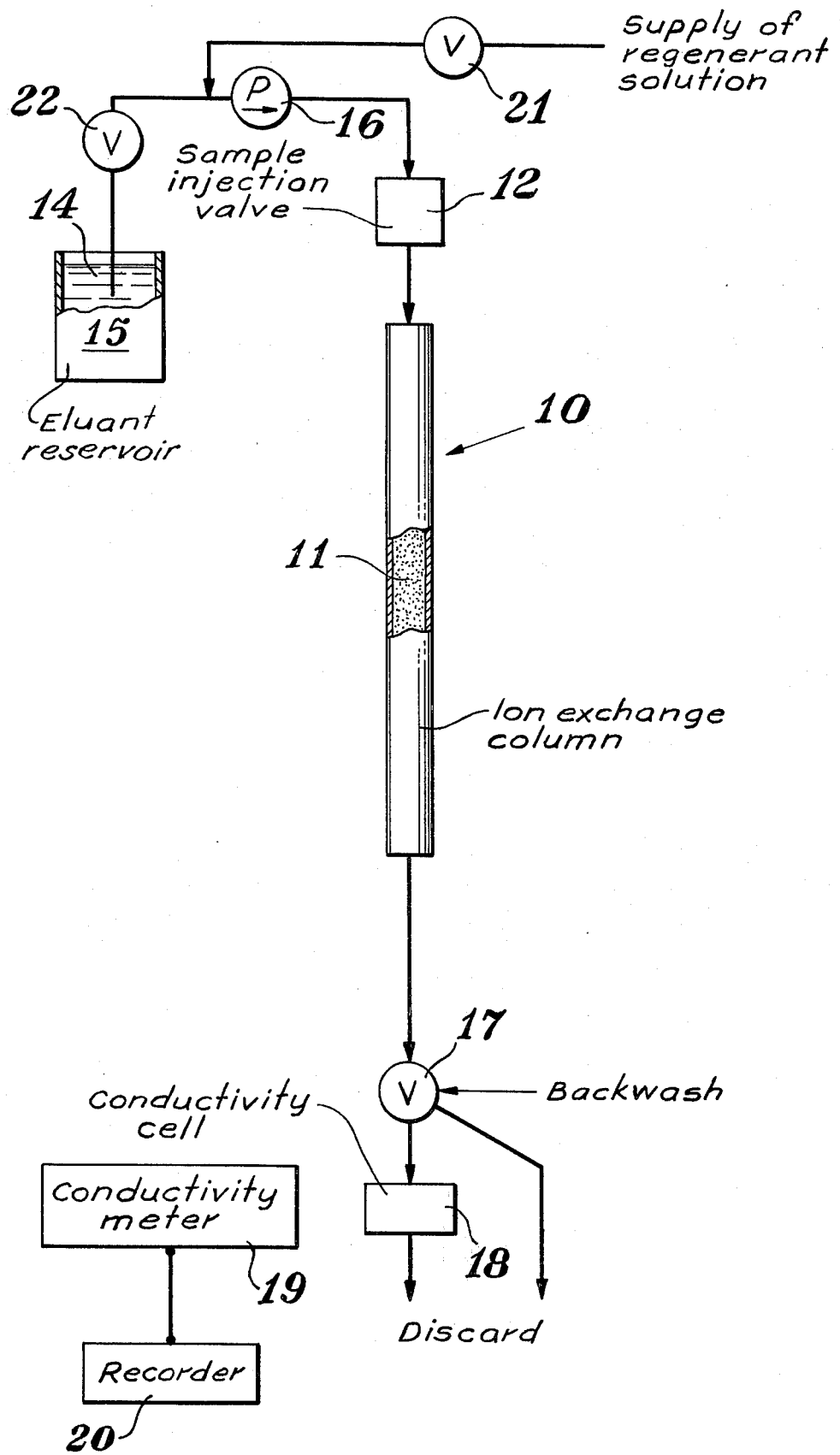

QUANTITATIVE ANALYSIS OF SINGLE ION SPECIES

CROSS REFERENCE TO RELATED APPLICATIONS

In a co-pending application of Hamish Small and William C. Bauman, Ser. No. 386,260, filed even date herewith, there is described a method for chromatographic quantitative analysis of cationic species in solution wherein the solution is passed first through a separator ion exchange resin bed means and then through a stripper ion exchange resin bed means and then through a detector such as a conductivity cell and associated readout means. Chromatographic separation is carried out in the separator bed and in the stripper bed the developing reagent used in the eluant solution is acted upon by an ion exchange resin so that the developing reagent does not reach the detector in highly ionized form along with the separated ionic species being analyzed. For example, the developing reagent is converted to a weakly dissociated molecule such as water or is captured on ion exchange sites.

In a copending application of Timothy S. Stevens, Ser. No. 386,262, filed even date herewith, there is described a method for chromatographic quantitative analysis of cationic species in solution, particularly the more tightly bound cations, wherein cationic species such as amines are maintained in stable ionic form wherein the eluant solution employed consists of a mixture of a metal ion capable of moving the more tightly bound cations off a cation exchange resin and sufficient hydronium ion to assure stabilization of ions such as protonated amines so that chromatographic separation is possible upon a separator cation exchange resin bed. Use of such mixed developing reagent as the eluant solution is made possible by the employment of two separate stripper anion exchange resin beds in series, the first bed containing an anion exchange resin in a form suitable for precipitation of the metal ion used in the developing reagent and the second bed containing an anion exchange resin in the hydroxide form whereby all of the hydronium ion utilized is neutralized before the solution of separated cations under determination exit from the third chromatographic column and are directed to a detector such as conductivity cell.

In a copending application of Hamish Small and Timothy S. Stevens, Ser. No. 386,263, filed even date herewith there is disclosed the determination of the total ionic content of an aqueous sample solution on utilizing ion exchange method in which the sample solution is added to a cation exchange resin in easily elutable cation form and the easily elutable cations displaced are eluted from the column with water, the effluent being passed to an anion exchange resin which is in easily elutable anionic form, usually the hydroxide form. In the latter column all the anionic species in the sample are exchanged for a single anion. The effluent from the second resin bed, consisting entirely of a single ion pair species viz., the preselected cation and the preselected anion, in water solution, is passed through a conductivity cell. Readout means associated with the conductivity cell indicate the number of equivalents of the single ion pair species corresponding to the number of equivalents of ionically dissociated compounds in the predetermined volume of sample solution.

In an additional copending application of Timothy S. Stevens and Hamish Small, Ser. No. 386,261, filed even date herewith, there is described a method and apparatus for quantitative analysis by chomatography of cationic species in solution wherein cations are chromatographically resolved on a separator cation exchange resin bed means on elution with either aqueous silver nitrate or barium chloride solution, after which the effluent from the cation exchange resin is passed through a stripper anion exchange resin bed means charged with an anion exchange resin in either the chloride or the sulfate form and the effluent passed through a detector such as a conductivity cell.

In another copending application of Hamish Small and Timothy S. Stevens Ser. No. 386,264, filed even date herewith there is described apparatus and method for chromatographically separating and detecting carboxylic acids or carboxylates using a cation exchange resin and water as eluant and a conductivity cell as common detector, with or without need for prior separation of inorganic halides on a silver ion form column.

BACKGROUND OF THE INVENTION

1. Field of the Invention

The invention relates to apparatus method for quantitative analysis of a single ion species paired with at least one species of counter valent ion in an aqueous or highly polar sample solution, the solution containing substantially no other ions of the same valence as said single ion save for ions capable of forming a relatively undissociated ion pair with hydrogen ions or hydroxide ions. The invention more particularly relates to apparatus method for quantitative analysis of such solution of single ion species by ion exchange and utilizing a highly sensitive detector.

2. Description of the Prior Art

Heretofore ion exchange resins have been widely used for the purification of water and for the recovery of ion species such as valuable ore metals. In a case of the large industrial double bed exchanger the effluent from the second bed has been monitored with a conductivity cell to determine break through of hardness ions when the exchange capacity of the resin is exceeded. But in the field of analytical chemistry the utility of the possibilities of carrying selective ion exchange operations and of monitoring the results thereof with a sensitive detector such as a conductivity cell seems to have been little appreciated or understood.

SUMMARY OF THE INVENTION

It has now been discovered that quantitative analysis of a single ion species paired with at least one species of counter valent ion in an aqueous or highly polar sample solution, the solution containing substantially no other ions of the valence as said single ion species save for ions capable of forming relatively undissociated ion pairs with hydrogen ions or hydroxide ions, is readily and expeditiously carried out upon adding a predetermined amount of the sample solution to an ion exchange resin bed means, the resin bed being charged with an ion exchange resin capable of ion exchange with ions of the same valence as the at least one species of counter valent ion and the ion exchange resin being in an ion form easily elutable by said at least one species of counter valent ion, eluting the single ion species from the ion exchange resin bed means with water and passing the effluent from the ion exchange resin bed means to a conductivity cell having associated read-out means, the effluent containing substantially only the single ion species and the single counter valent ion eluted from the ion exchange resin. The response of the conductivity cell is accurately relatable to the concentration of the single ion species passing through the conductivity cell.

The present apparatus includes an ion exchange column and conductivity cell connected in series by liquid conduit means, means for adding liquid sample solution and eluant water to the column and read-out means associated with the conductivity cell. The ion exchange column is charged with an ion exchange resin suitably selected for the exchange of the counter valent ions of the ion to be determined in a given sample solution to be analyzed.

BRIEF DESCRIPTION OF THE DRAWING

The single FIGURE of the drawing is a schematic representation of an embodiment of the apparatus of the invention showing in series a reservoir for eluant water, a pump, a special injection valve or other sample injection device, an ion exchange column and a conductivity cell, having associated read-out means, and liquid conduit means connecting the components of the apparatus.

FURTHER DESCRIPTION OF THE INVENTION

The present method and apparatus are well adapted for the rapid and automated analysis of a great variety of ionic species present in a very particular kind of sample in which there is only one ion species to be determined and substantially no other ions of the same valence sign, save for ions capable of forming a relatively undissociated ion pairs with hydrogen ions or hydroxide ions, the single ion to be determined being paired with at least one and usually a plurality or more of species of counter valent ion.

The method is predicated on the concept that upon converting all of the at least one species of counter valent ion to just one counter valent ion and bringing then a single pair of ions consisting of the species to be determined and a single counter valent ion to the conductivity cell the response of the conductivity cell is readily related accurately to the concentration of the single ion species admitted to the conductivity cell. The method is exceedingly rapid and simple and inexpensive to carry out and is readily instrumented for carrying out at remote locations and automatically without the intervention of a human operator. Furthermore, the instrument is readily adapted to the analysis of any of a great variety of ions, specially since the conductivity cell which serves as the detector is universal in application and requires no change from ion species to ion species.

Single ion species which are analyzable according to the invention must be in ionic form and must be present in solution as the only ion species of the same valence, save for the ions capable of forming relatively undissociated ion pairs with hydrogen ions of hydroxide ions. To this extent the analysis is highly specialized.

Referring to the single FIGURE of the drawing, the apparatus of the present invention is seen basically to consist very simply of the ion exchange column 10 charged with an ion exchange resin 11 and supplied with sample from sample injection valve 12 by liquid conduit means, sample being swept to the column by water 14 drawn from eluant reservoir 15 or other suitable source of distilled water or deionized water by pump 16. Effluent leaving the chromatographic column 10 is conveyed by liquid conduit means via a valve 17 to a conductivity cell 18 and thence to discard. The electrical signal from the conductivity cell 18 is directed to a conductivity meter 19 which is electrically connected to a recorder 20. Preferably the recorder 20 is a recorder-integrator.

The sample injection valve 12 is of the type commonly used for chromatographic analyses and typically is provided with a measuring bore in the valve plug of known volume or a pair of ports to the valve body are connected by a tubing loop of known volume and the valve is provided with bypass means for continuously directing eluant liquid through the valve means to the connected ion exchange column. In any event, the sample-holding void space is filled by a syringe or other convenient means after which the valve is manipulated to bring the sample-holding void space into series with the stream of solution of eluant constantly passing through a portion of the valve body and the selected sample portion is thereby swept onto the connected ion exchange column.

In carrying out analysis according to the present invention method reference being had to the drawing, a sample is added to or introduced to the ion exchange column 10 by any suitable means such as by measuring pipet and the sample eluted through the column by gravity flow means using a biuret or beaker or other means of introducing water into the column. However, it is much preferred to use a steady stream of eluant liquid, here, water supplied by pump 16 and drawn from reservoir 15 or here, water supplied by pump 16 and drawn from reservoir 15 or other suitable source of supply, and to pass the eluant stream through the sample injection valve 12 and to thereby sweep the preselected quantity of sample solution into the ion exchange column 10.

Wherein the sample solution to be analyzed contains, as a single ion species, a cation to be determined and there being present with the cation at least one species of anion and more typically a plurality or greater number of anions wherefore the present method has greater advantage and utility, the ion exchange resin 11 provided in the ion exchange column 10 is preferably a high capacity, strong base anion exchange resin. Essentially the resin must be in an ion form easily elutable by all of the at least one counter valent anion present in the solution along with the cation to be determined. Ions which are easily elutable by most other anions are the hydroxide ion and the acetate ions. In order that the single cation species may assuredly traverse the ion exchange resin bed in the ion exchange column 10, the ion form of the ion exchange resin 11 is selected with a view to the cation to be determined so that an insoluble pair is not formed at the concentration levels contemplated. With the ion exchange resin 11 in the acetate form most any species of water soluble cation is able to traverse the anion exchange resin in the acetate form. With the anion exchange resin 11 in the hydroxide form, the alkaline-earth metal ions tend to be precipitated and the cations most readily analyzable as single species include the alkalimetal ions, water-soluble protonated amines, water-soluble quaternary ammonium compounds, ammonia, barium and strontium.

In carrying out the present method wherein the sample solution contains a single anion to be analyzed the ion exchange resin 11 in the ion exchange column 10 is a cation exchange resin in an ion form easily elutable by all of the at least one species of counter valent cation present in the sample solution with the single sepcies of anion to be determined. Preferably, the cation exchange resin 11 in this instance is a high capacity strong acid ion exchange resin. Easily elutable forms of such resin include the hydrogen ion form and the lithium ion form. Anions which are readily determinable using the present method and apparatus include any one of chloride, bromide, iodide, sulfate, bisulfate, sulfite, bisulfite, nitrate, nitrite, othophosphate, monohydrogenphosphate, dihydrogenphosphate, metaphosphate, phosphite and water-soluble carboxylic acids having a dissociation constant greater than about $1 \times 10^{-6}$.

The amount of sample added to the column by means of the sample injection valve is ordinarily very small since very little sample is needed to activate the conductivity cell. Typically, the amount of sample is in the range of about 0.002 to about 5 ml. and more preferably from about 0.02 to about 0.5 ml.

Upon continuing to direct eluant water to the ion exchange column the single ion species to be determined is eluted off the column in a single concentration peak to the conductivity cell 18 which generates an electrical signal which is directed to the conductivity meter 19 and is read-out on recorder 20 as a visible signal.

It must be understood that the column shown in the drawing is ordinarily of small diameter tubing, usually of glass or stainless steel, the small diameter, together with fast flow rates of eluant water facilitating analysis times of generally no more than 5 to 10 minutes, though longer times are occasionally needed. For the purposes of the present discussion and the appended claims, small diameter columns are those having an internal diameter (i.d.) in the range of about 2 to about 10 millimeters. Larger diameter columns may be used, if desired, such as columns having an i.d. of 25 or 50 millimeters, but columns of about 2 to about 10 millimeters i.d. are more frequently accepted as well understood in the art. Therefore, it is generally preferred for the practice of the present invention in routine analytical work that the size of columns employed be no more than about 10 millimeters i.d.

Generally, the amount of sample solution selected for injection contains an amount of single ion species expressed in milliequivalents not greater than about 1/10,000 to about 1/10 and more preferably not greater than about 1/100 and even more preferably not greater than about 1/1,000 of the total ion exchange capacity of the ion exchange resin in the ion exchange column, thus providing for numerous analyses before the column requires regeneration.

After the present apparatus has been used for a time it is necessary periodically at such time as the ion exchange resin 11 approaches exhaustion, to regenerate the ion exchange resin to place it back in the selected ion form. The column 10 may be removed from the apparatus and the ion exchange resin 11 regenerated elsewhere or the ion exchange resin 11 may be regenerated in place without disassembling the apparatus as well understood in the art.

The ion exchange resins usable in the present method and apparatus are typically polystyrene or modified polystyrene copolymers cross-linked, e.g., with divinylbenzene, and carrying nuclear groups, the latter providing active exchange cites. The cation exchange resins carry nuclear sulfonic acid or sulfonate groups along the polymer chain. The strong base anion exchange resins carry nuclear chloromethyl groups which have been quaternized.

For further information on ion exchange theory, processes and resins synthesis reference is made to the monograph "Dowex: Ion Exchange" 3rd. Ed. 1964, published by The Dow Chemical Company, Midland, Mich. and the two volume work "Ion Exchange" Ed. by Jacob A. Marinski and published by Marcel Dekker Inc., New York 1966. Chapter 6, Vol. 2, of "Ion Exchange" is devoted to a description of synthesis of ion exchange resins of various types usable herein.

A relatively undissociated ion pair is one having a dissociation constant of at most about $1 \times 10^{-6}$. Ions forming such an ion pair with hydrogen ions are hydroxide ions are scarcely, if at all, detectable by the conductivity cell and thus do not interfere with the determination of a single ion species by the present method.

EXAMPLES

The following examples serve to illustrate the use of the method and apparatus of the invention and the scope of the invention is not intended to be limited thereto.

EXAMPLE 1

A 9 × 250 mm column was filled with Dowex 1 × 8 type ion-exchange resin, 200–400 mesh size, in the hydroxide ion form. The samples were directed to the column by a sample injection valve injecting about 100 microliters of sample. The sample was eluted with a pumped stream of de-ionized water at a rate of 460 ml/hr. The effluent from the column was directed to a conductivity cell and readout means. Samples were injected of standard solutions of known sodium concentrations and then samples of sodium phenate-sodium salicylate, dissolved in de-ionized water, were injected and the amount of sodium determined. The determinations of sodium by the method herein described were compared to the determinations made by Neutron Activation Analysis (NAA). NAA is an accepted method of accurate sodium determination. The data are listed in the following tables.

Table I

| Sample | | Conductivity peak height |
|---|---|---|
| 394 | ppm Na | 1300 |
| 39.4 | ppm Na | 126 |
| 4 | ppm Na | 10.8 |

Table II

| Sample | % by the method here described | %Na by NAA |
|---|---|---|
| Sodium Salicylate-Sodium Phenate Mixture number 1 | 22.1 | 22.1±0.2 |
| Sodium Salicylate Sodium Phenate Mixture number 2 | 22.1 | 22.0±0.2 |
| Sodium Salicylate Sodium Phenate Mixture number 3 | 21.2 | 21.4±0.2 |

The excellent agreement between the values of sodium content obtained by the method herein described and by neutron activation illustrates the utility of the former as a means of determining a single cation concentration, in this case sodium.

EXAMPLE 2

In the example of the determination of a single anion namely chloride ion, a column 9 × 250 mm is filled with a commercial cation exchange resin, Dowex 50w × 8, 200–400 mesh, in the hydrogen ion form. This column is coupled to a sample injection valve, pump and eluant reservoir, while the effluent is directed to a conductivity cell and readout means all substantially following the scheme of the drawing. A 10 microliter sample of an aqueous solution of sodium chloride of known concentration is injected and eluted with deionized water and the height of the conductivity peak is measured. Then an aqueous solution containing a mixture of sodium chloride, potassium chloride and magnesium chloride is injected and the height of the conductivity peak also measured. The concentration of the chloride ion in the mixture is then calculated using the heights of the two peaks and the knowledge of the chloride ion concentration of the sodium chloride standard.

What is claimed is:

1. The method of chromatographic quantitative analysis of a single ion species paired with at least one species of countervalent ion in a sample solution, the solution containing substantially no other ions of the same valence as said single ion, save for ions capable of forming relatively undissociated ion pairs with hydrogen ions or hydroxide ions, which comprises:

adding a predetermined amount of said sample solutions to ion exchange resin bed means, said means being charged with an ion exchange resin capable of exchanging ions of the same valence signed as the countervalent ion and the ion exchange resin being in an ion form easily eluted by said at least one species of countervalent ion;

and eluting said sample from the column with water as eluant, said sample being in the form of a single ion pair consisting of the single ion species to be determined and a single species of countervalent ion, the countervalent ion being the ion form in which the ion exchange resin has been prepared;

and passing the effluent from said resin bed means through a conductivity cell having associated read out means, thereby quantitatively detecting the single ion species to be determined.

2. The method as in claim 1 in which the single ion species is a cation and the ion exchange resin is an anion exchange resin.

3. The method as in claim 2 in which the anion exchange resin is in the hydroxide form and the cation is selected from the group consisting of alkali metal, ammonia, water-soluble protonated, organic amine, water-soluble quaternary ammonium compound, barium ion and strontium ion.

4. The method as in claim 2 in which the anion exchange resin is in the acetate form and the cation is selected from the group consisting of the ions of alkali metal, alkaline-earth metal, ammonia, water-soluble protonated organic amine and water-soluble quaternary ammonium compound.

5. The method as in claim 1 in which the single ion species is an anion and the ion exchange resin is a cation exchange resin.

6. The method as in claim 5 in which the cation exchange resin is in the hydrogen ion form.

7. The method as in claim 5 in which the cation exchange resin is in the lithium ion form.

8. The method as in claim 5 in which the anion is selected from the group consisting of chloride, bromide, iodide, nitrate, nitrite, sulfate, sulfite, bisulfate, bisulfite, carbonate, orthophosphate, hydrogenphosphate, dihydrogenphosphate, metaphosphate, phosphite, and carboxylate ion of water-soluble carboxylic acids having a dissociation constant at least equal to $1 \times 10^{-6}$.

* * * * *